United States Patent
Morimoto

Patent Number: 5,872,753
Date of Patent: Feb. 16, 1999

[54] OPTICAL DISK DRIVING APPARATUS WITH TRACKING CONTROL

[75] Inventor: Toshiro Morimoto, Kanagawa, Japan

[73] Assignee: Sony Corporation, Tokyo, Japan

[21] Appl. No.: 22,463

[22] Filed: Feb. 12, 1998

Related U.S. Application Data

[63] Continuation of Ser. No. 73,930, Jun. 9, 1993, abandoned.

[30] Foreign Application Priority Data

Jun. 9, 1992  [JP]  Japan ................................. 4-149614

[51] Int. Cl.$^6$ ........................................................ G11B 7/00
[52] U.S. Cl. ............................................... 369/50; 369/58
[58] Field of Search .................................. 369/50, 47, 48, 369/49, 54, 58, 59, 32, 44.27, 44.28, 44.34, 44.25

[56] References Cited

U.S. PATENT DOCUMENTS

| | | | |
|---|---|---|---|
| 4,660,189 | 4/1987 | Tsukamura et al. | 369/32 |
| 4,779,032 | 10/1988 | Sakaegi et al. | 318/685 |
| 4,855,978 | 8/1989 | Kanamaru | 369/32 |
| 4,918,676 | 4/1990 | Miyasaka | 369/32 |
| 5,088,075 | 2/1992 | Yokota | 369/32 |
| 5,105,402 | 4/1992 | Ishii et al. | 369/43 |
| 5,126,994 | 6/1992 | Ogawa et al. | 369/116 |
| 5,216,647 | 6/1993 | Kitani | 369/50 X |
| 5,218,453 | 6/1993 | Hashimoto | 358/342 |

*Primary Examiner*—Muhammad N. Edun
*Attorney, Agent, or Firm*—Limbach & Limbach L.L.P.

[57] ABSTRACT

An optical disk driving apparatus comprises an optical pickup device having a laser beam source for emitting a laser beam to a disk recording medium, a unit for rotating the disk recording medium such that a linear velocity of a track on the recording medium accessed by the optical pickup device becomes a predetermined value, a unit for translating the optical pickup device along a radius of the disk recording medium in accordance with a seek signal indicative of the track to be accessed by the optical pickup device, and a unit responsive to the seek signal for controlling both the translating unit and the rotating unit, the translating means being prevented from translating the optical pickup device during a period until the linear velocity of the track desired by the seek signal on the disk recording medium reaches down to a value determined by the linear velocity of the desired track when the seek signal represents the order to transfer the optical pickup device from inner to outer tracks of the disk.

4 Claims, 2 Drawing Sheets

OPTICAL DISK DRIVING APPARATUS WITH TRACKING CONTROL

This is a continuation of application Ser. No. 08/073,930, filed Jun. 9, 1993 now abandoned.

BACKGROUND OF THE INVENTION

1. Field of the Invention

The present invention relates to an optical disk driving apparatus having an optical disk that is rotated according to a constant linear velocity (CLV) system and, more particularly, to an optical disk driving apparatus in which an optical pickup device can be translated on the optical disk at high speed and a method of translating the optical pickup device.

2. Description of the Prior Art

One recent optical disk driving apparatus tends to increase a recording density of an optical disk by rotating the optical disk at the constant linear velocity (hereinafter referred to as a CLV, if necessary). Further, recent optical disk apparatus tend to increase the transfer rate of data by increasing the revolution rate of an optical disk. U.S. Pat. Nos. 4,660,189 and 5,126,994 describe the above-mentioned optical disk driving apparatus of such as CLV system.

Generally, when an optical pickup device is translated along a radial direction of an optical disk (i.e., during a seek operation), the optical pickup device is translated under the focusing servo in order to record or reproduce a signal immediately after the seek operation. An upper limit of a revolution rate of the optical disk is determined by the limit frequency of the focusing servo, i.e., a frequency at which an open loop characteristic of the focusing servo crosses 0 dB. The limit frequency of the focusing servo is a limit frequency at which the optical pickup device can be translated by a motor in response to a focus error amount in order to effect the focusing servo.

An optical pickup device that is located at a relatively outer peripheral side of the optical disk is translated toward the inner peripheral side in about 0.1 second if the optical disk is a 12-inch write once optical disk. Also, it takes about 1.2 seconds for a optical disk to increase a rotational speed on the outer peripheral side, i.e., from a rotational speed of 1080 r.p.m. to a rotational speed on the inner peripheral side, i.e., 2160 r.p.m.

Therefore, when the optical pickup device is translated from the outer to inner peripheral sides of the optical disk, even if the optical pickup device is translated and the rotational speed of the optical disk is changed at the same time, then the rotational speed of the optical disk does not reach the rotational speed on the inner peripheral side track after the optical pickup device is translated toward the inner peripheral side. In this case, however, the focusing servo can follow such rotational speed because the frequency of the focusing servo becomes a value lower than a value desired by a limit frequency of the focusing servo.

When the optical pickup device is translated from the inner to the outer peripheral sides of the optical disk, if the optical pickup device is translated and the rotational speed of the optical disk is changed at the same time, then the rotational speed of the optical disk is not reduced sufficiently by the time the optical pickup device reaches the outer peripheral side of the optical disk. There is then the disadvantage that the frequency of the focusing servo exceeds the limit frequency of the focusing servo. As a consequence, the optical pickup device cannot follow the optical disk according to the focusing servo so that the optical pickup device is brought in contact with the surface of the optical disk.

OBJECTS AND SUMMARY OF THE INVENTION

Therefore, it is a general object of the present invention to provide an improved optical disk driving apparatus and a method of translating an optical pickup device in which the aforesaid shortcomings and disadvantages encountered with the prior art can be eliminated.

More specifically, it is an object of the present invention to provide an optical disk driving apparatus and a method of translating an optical pickup device in which a focusing servo can be prevented from being disabled.

It is another object of the present invention to provide an optical disk driving apparatus and a method of translating an optical pickup device in which a high speed seek property can be prevented from being lost.

It is a further object of the present invention to provide an optical disk driving apparatus and a method of translating an optical pickup device in which a high speed transfer rate of data can be realized.

According to a first aspect of the present invention, there is provided an optical disk driving apparatus which comprises an optical pickup device having a laser beam source for emitting a laser beam to a disk recording medium, a unit for rotating the disk recording medium such that a linear velocity of a track on the recording medium accessed by the optical pickup device becomes a predetermined value, a unit for translating the optical pickup device along a radius of the disk recording medium in accordance with a seek signal indicative of the track to be accessed by the optical pickup device, and a unit responsive to the seek signal for controlling both the translating unit and the rotating unit, the translating unit being prevented from translating the optical pickup device during a period until the linear velocity of the track desired by the seek signal on the disk recording medium reaches down to a value determined by the linear velocity of the desired track when the seek signal represents the order to transfer the optical pickup device from inner to outer tracks of the disk.

In accordance with a second aspect of the present invention, there is provided an optical disk driving apparatus which comprises an optical pickup device having a laser beam source for emitting a laser beam to a disk recording medium, a unit for rotating the disk recording medium such that a linear velocity of a track on the disk recording medium accessed by the optical pickup device becomes a predetermined value, a unit for translating the optical pickup device along a radius of the disk recording medium in accordance with the seek signal indicative of the track to be accessed by the optical pickup device, and a unit responsive to a seek signal for controlling both the translating unit and the rotating unit, the translating unit being prevented from translating the optical pickup device during a period until the linear velocity of the track desired by the seek signal on the disk recording medium reaches down to substantially the same value as the linear velocity of the desired track when the seek signal represents the order to transfer the optical pickup device from inner to outer tracks of the disk.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

An embodiment of an optical disk driving apparatus to which an optical pickup device translating method of the present invention is applied will now be described with reference to the drawings.

Figure 1:
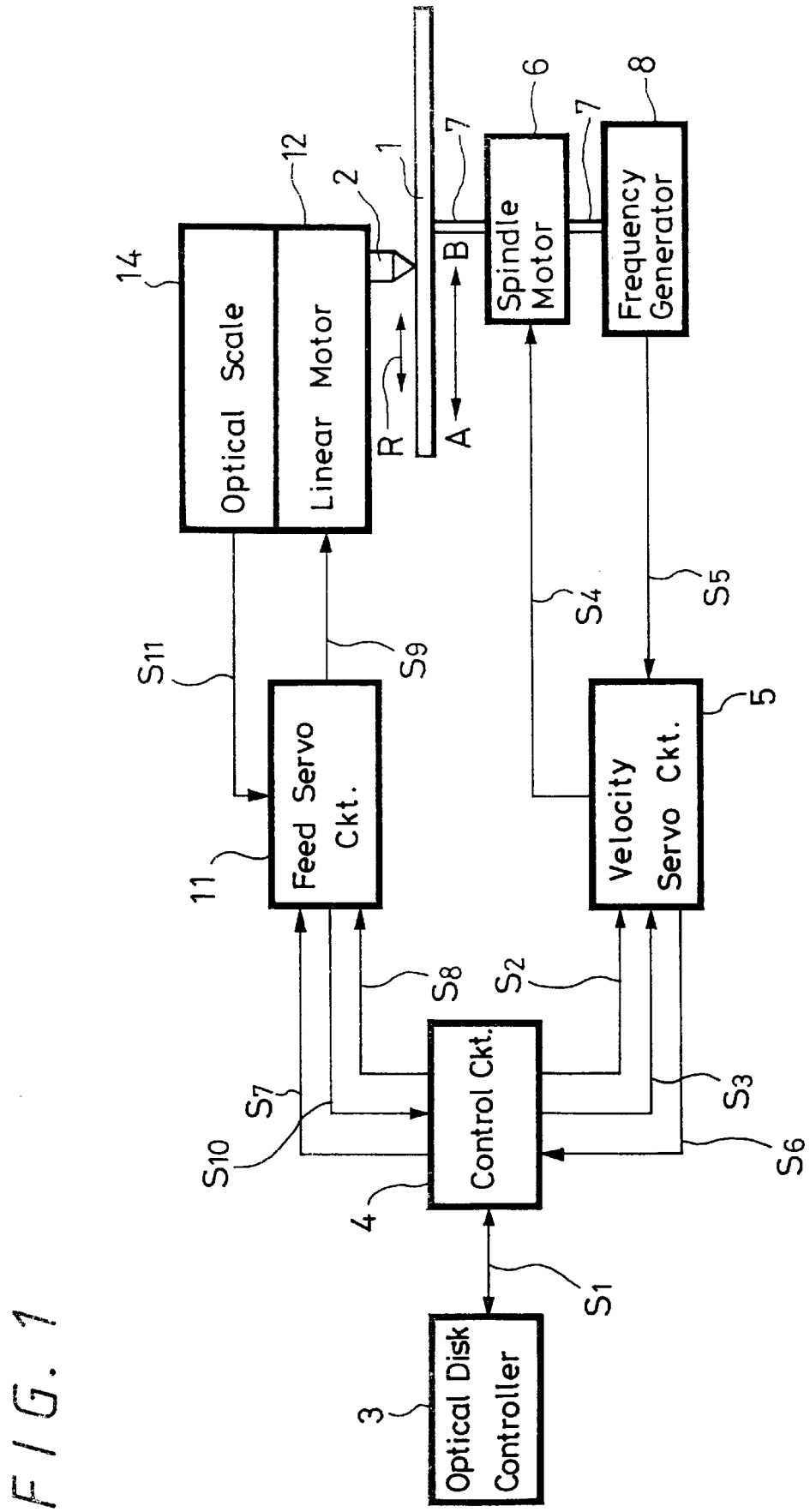
FIG. 1 is a block diagram showing a circuit arrangement of an optical disk driving apparatus to which an embodiment of an optical pickup device translating method according to the present invention is applied.

FIG. 1 of the accompanying drawings generally shows in block form a circuit arrangement of an optical disk driving apparatus according to an embodiment of the present invention.

As shown in FIG. 1, this optical disk driving apparatus records or reproduces an information signal by the access of an optical disk 1 rotating at a constant linear velocity by a laser beam emitted from an optical pickup device 2.

The optical disk 1 might be any one of a write once optical disk, an erasable optical disk, a CD-ROM disk and a read-only optical disk. In this embodiment, the optical disk 1 is a 12-inch write once optical disk.

When the 12-inch write once optical disk is employed as the optical disk 1, for example, a revolution rate on the innermost peripheral track is 2160 r.p.m. and a revolution rate of the outermost peripheral track is 1080 r.p.m. It takes about 1.2 seconds until the revolution rate is changed from 2160 r.p.m. to 1080 r.p.m and then stabilized. Also, it takes about 0.1 second for the optical pickup device 2 to move from an inner peripheral side B to an outer peripheral side A of the optical disk 1. That is, as compared with a time in which the optical pickup device 2 is translated to a desired or target track, it takes more time for the optical disk 1 to reach a revolution rate corresponding to a linear velocity on the target track.

Referring to FIG. 1, an optical disk controller 3 supplies a control circuit (control means) 4 with address data $S_1$ that is indicative of a track (hereinafter referred to as a designated track $T_1$) to be recorded or reproduced, i.e., a target portion (desired portion).

The control circuit 4 includes a CPU (central processing unit), a ROM (read-only memory), a RAM (random access memory), an I/O (input/output) interface or the like, though not shown.

In response to the address data $S_1$, the control circuit 4 reads out a revolution rate (hereinafter referred to as a designated revolution rate $N_1$) corresponding to a linear velocity on the designate track $T_1$ designate by the address data $S_1$ from the ROM and supplies its revolution rate data $S_2$ and a revolution rate change start signal $S_3$ to a velocity servo circuit 5. The velocity servo circuit 5 supplies a drive signal $S_4$ corresponding to the revolution rate data $S_2$ to a spindle motor 6. The spindle motor 6 is rotated in response to the drive signal $S_4$. The spindle motor 6 has a rotary shaft 7 and the optical disk 1 is rotated by the rotary shaft 7 when the rotary shaft 7 is rotated.

The rotary shaft 7 has a frequency generator 8 coaxially provided thereon so that, when an FG pulse $S_5$ output from the frequency generator 8 is supplied to the velocity servo circuit 5, the velocity servo is effected to rotate the spindle motor 6 at the designated revolution rate $N_1$ designated by the revolution rate data $S_2$.

The control circuit 4 supplies feed amount data $S_8$ (generally referred to as stroke data) corresponding to the address data $S_1$ to a feed servo circuit 11 and a feed start signal $S_7$ is supplied to the feed servo circuit 11. The feed servo circuit 11 supplies a linear motor 12 with a drive signal $S_9$ corresponding to the feed amount data $S_8$, thereby translating the optical pickup device 2 on the axis of the linear motor 12 along a radial direction R of the optical disk 1 between the inner peripheral side B and the outer peripheral side A.

The feed servo circuit 11 judges the movement amount of the optical pickup device 2 on the basis of a scale pulse $S_{11}$ generated from an optical scale 14 and effects the feed servo, whereby the optical pickup device 2 is translated to the designated track $T_1$ designated by the address data $S_1$. When the optical pickup device 2 is translated to the designated track $T_1$, a feed end signal $S_{10}$ is supplied to the control circuit 4 from the feed servo circuit 11.

Though not shown, the optical pickup device 2 detects a focus error on the basis of a reflected-back light of a light beam emitted therefrom according to a well-known astigmatism method, and a position of the optical pickup device 2 in the focus direction is controlled by a focus servo mechanism. Therefore, the optical pickup device 2 is translated in the radial direction of the optical disk 1 under the focusing servo. The optical pickup device 2 is translated under the focusing servo because the recording or reproduction is effected in a very short period of time immediately after the optical pickup device 2 was translated.

Operation of the embodiment will be described with reference to a flowchart shown in FIG. 2.

Figure 2:
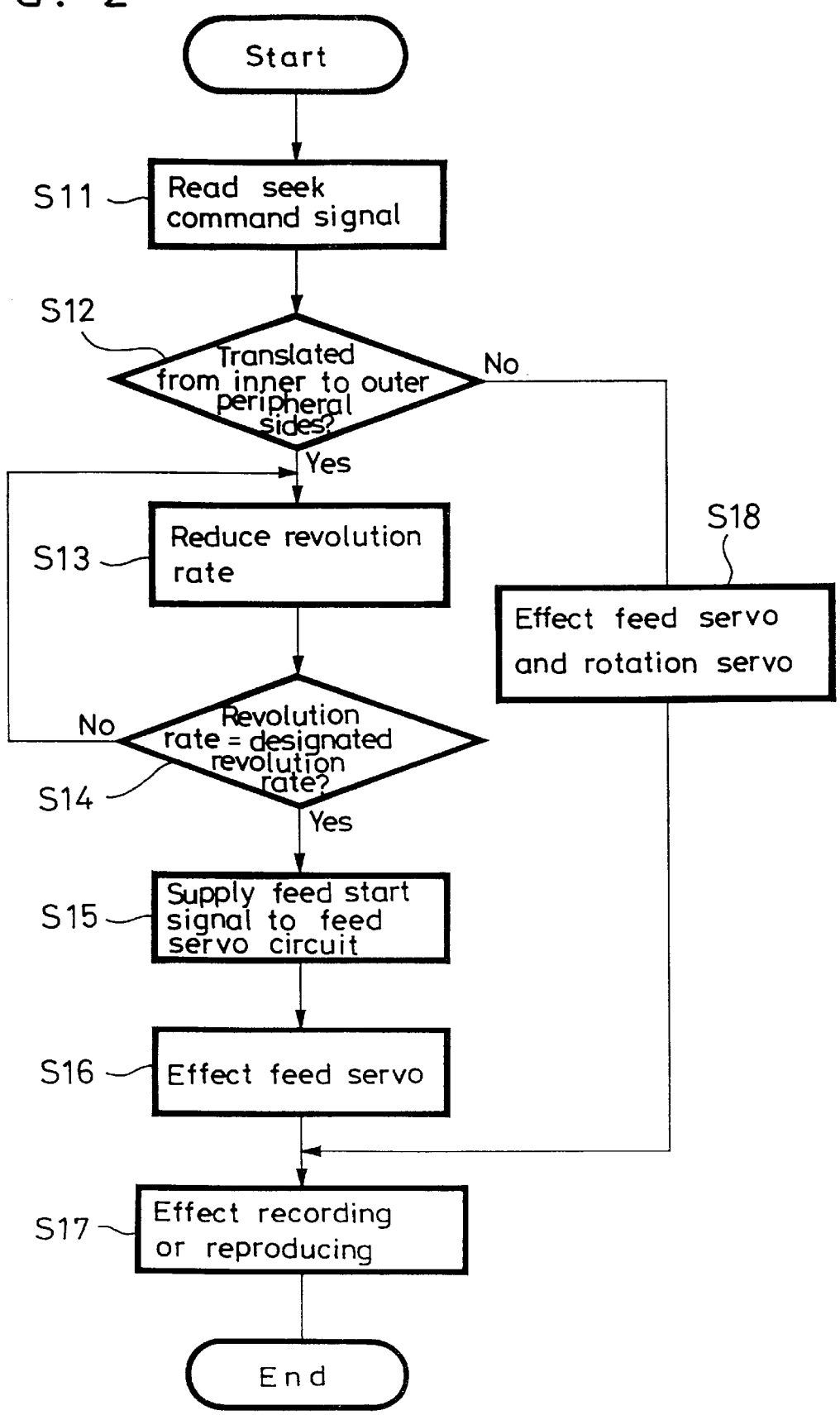
FIG. 2 is a flowchart to which references will be made in explaining operation of the optical disk driving apparatus shown in FIG. 1.

FIG. 2 shows a flowchart of a program stored in the ROM (not shown) provided within the control circuit 4.

As shown in FIG. 2, following the start of operation, the optical disk controller 3 supplies the control circuit 4 with the address to be recorded or reproduced, i.e., the designated track $T_1$ as the address data $S_1$. Then, the control circuit 4 reads the address data $S_1$, i.e., a seek command signal from the ROM at step S11.

In the next decision step S12, the control circuit 4 determines whether or not the seek command signal is a command that is used to translate the optical pickup device 2 from the inner peripheral side B to the outer peripheral side A. If the seek command signal is the command to translate the optical pickup device 2 from the inner peripheral side B to the outer peripheral side A as represented by a YES at decision step S12, then the processing proceeds to step S13. In step S13, the feed amount data $S_8$ is supplied to the feed servo circuit 11 but the feed start signal $S_7$ is not supplied thereto so that the optical pickup device 2 is held in the standby mode on the inner peripheral side B of the optical disk 1. Also, the control circuit 4 supplies the revolution rate data $S_2$ (designated revolution rate $N_1$ (target revolution rate)) corresponding to the designated track $T_1$ and the revolution rate change start signal $S_3$, i.e., a revolution rate reduction command signal to the velocity servo circuit 5.

When the velocity servo circuit 5 supplies the drive signal $S_4$ to the spindle motor 6 in response to the revolution rate data $S_2$, the spindle motor 6 starts to reduce its revolution rate so that its revolution rate reaches the designated revolution rate $N_1$. The velocity servo circuit 5 detects the current revolution rate of the spindle motor 6 on the basis of the FG pulse $S_5$ supplied thereto from the frequency generator 8. When the revolution rate of the spindle motor 6 becomes coincident with the designated revolution rate $N_1$, the velocity servo circuit 5 supplies a lock pulse $S_6$ to the control circuit 4.

In decision step S14, the control circuit 4 determines on the basis of the lock pulse $S_6$ that the revolution rate has become coincident with the designated revolution rate $N_1$. Then, the processing proceeds to the next step S15, wherein the control circuit 4 supplies the feed start signal $S_7$ (move command signal) to the feed servo circuit 11. At this timing point, the optical disk 1 ends the reduction of its revolution rate, i.e., from 2160 r.p.m to the designated revolution rate $N_1$=1080 r.p.m.

If on the other hand the revolution rate of the spindle motor 6 is not coincident with the designated revolution rate $N_1$ as represented by a NO at decision step S14, then the processing returns to step S13.

The feed servo circuit 11 is activated by the feed start signal $S_7$ supplied thereto to supply the drive signal $S_9$ to the linear motor 12, whereby the optical pickup device 2 starts to move from the inner peripheral side B to the outer peripheral side A. The feed servo circuit 11 detects the movement amount (stroke amount) of the optical pickup device 2 on the basis of the scale pulse $S_{11}$ from the optical scale 14. When the optical pickup device 2 is translated to the position of the predetermined track $T_1$, in step S16, the feed end signal $S_{10}$ is supplied to the control circuit 4 from the feed servo circuit 11. In the next step S17, the control circuit 4 effects a predetermined recording or reproducing processing after the feed end signal $S_{10}$ was supplied thereto.

If the optical pickup device 2 is not translated from the inner peripheral side B to the outer peripheral side A as represented by a NO at decision step S12, then the processing proceeds to step S18, wherein both of the feed start signal $S_7$ and the feed amount data $S_8$ are supplied to the feed servo circuit 11 from the control circuit 4 and also the revolution rate data $S_2$ and the revolution rate change start signal $S_3$ are supplied to the velocity servo circuit 5 substantially at the same time. Therefore, the optical pickup device 2 can start to move immediately and can be translated to the designated track $T_1$. It is customary that the revolution rate is increased so as to match with the linear velocity on the designated track $T_1$ after the optical pickup device 2 was moved to the designated track $T_1$. Then, the processing proceeds to step S17, wherein the recording or reproducing operation is effected. Then, the processing is ended.

According to the aforesaid embodiment, when the control circuit 4 receives from the optical disk controller 3 the address data $S_1$ that translates the optical pickup device 2 from the inner peripheral side B to the designated track $T_1$ on the outer peripheral side A, the revolution rate of the optical disk 1 is first reduced to the designated revolution rate $N_1$ corresponding to the linear velocity on the designated track $T_1$ by effectively utilizing the velocity servo circuit 5. In the process in which the revolution rate is to be reduced, the optical pickup device 2 is prevented from being translated.

Then, the feed start signal $S_7$ is supplied from the control circuit 4 to the feed servo circuit 11 after the revolution rate reaches the designated revolution rate $N_1$ corresponding to the linear velocity on the designated track $T_1$, whereby the optical pickup device 2 starts to move from the inner peripheral side B to the outer peripheral side A of the optical disk 1.

Therefore, when the optical pickup device 2 is translated from the inner peripheral side B to the outer peripheral side A of the optical disk 1, a relative revolution rate between the optical pickup device 2 and the optical disk 1 is changed gently, thereby preventing the focus servo from being disabled. Also, a high speed seek operation can be effected and the optical pickup device 2 can therefore be translated quickly.

While the optical pickup device 2 is translated from the inner peripheral side B to the outer peripheral side A of the optical disk 1 after the revolution rate of the optical disk 1 reaches the designated revolution rate $N_1$ corresponding to the linear velocity on the designated track $T_1$ as described above, the present invention is not limited thereto and the following variant is also possible. That is, no trouble will occur so long as the optical pickup device 2 is moved in a range of a limit frequency of the focus servo. Therefore, when the revolution rate is reduced to a revolution rate substantially close to the revolution rate $N_1$ corresponding to the linear velocity on the designated track $T_1$, the feed start signal $S_7$ may be supplied to the servo circuit 11 from the control circuit 4. According to this variant, the optical disk 1 can be accessed at higher speed by the optical pickup device 2.

As set out above, according to the optical disk driving apparatus of the present invention, when supplied with the command signal that translates the optical pickup device from the inner peripheral side to the target portion on the outer peripheral side, the control means supplies the rotary drive means with the revolution rate reducing command signal that reduces the revolution rate of the optical disk to the revolution rate at the target position on the outer peripheral side or the revolution rate substantially close to the above-mentioned revolution rate. If the signal corresponding to the revolution rate fed back from the rotary drive means is the signal corresponding to the revolution rate reducing command signal, then the command that causes the moving means to start to move the optical pickup device from the inner peripheral side to the target portion on the outer peripheral side.

Therefore, when the optical pickup device is translated from the inner peripheral side to the outer peripheral side of the optical disk, the relative revolution rate between the optical pickup and the optical disk is changed gently, thereby preventing the focus servo from being disabled. Also, there is the effect that the high speed seek can be prevented from being lost. As a result, a high speed transfer rate of data can be realized.

According to the method of translating the optical pickup device, when the optical pickup device is translated from the inner peripheral side to the target portion on the outer peripheral side of the optical disk that is rotated at the constant linear velocity, the optical pickup device starts to move from the inner peripheral side to the outer peripheral side of the optical disk after the revolution rate of the optical disk is reduced to the revolution rate at the target portion or the revolution rate close to the above revolution rate.

Therefore, when the optical pickup device is translated from the inner peripheral side to the outer peripheral side of the optical disk, the relative revolution rate between the optical pickup device and the optical disk is changed gently, thereby preventing the focusing servo from being disabled. In addition, there is the effect that the high speed seek property can be prevented from being lost.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An optical disk driving apparatus comprising:

an optical pickup device having a laser beam source for emitting a laser beam to a constant linear velocity type disk recording medium;

means for rotating said disk recording medium;

means for translating said optical pickup device along a radius of said disk recording medium in accordance with a seek signal indicative of the track to be accessed by said optical pickup device; and control means responsive to said seek signal for controlling both said translating means and said rotating means, wherein said control means controls said rotating means to reduce a rotational speed of said disk recording medium before the rotational speed of said disk recording medium reaches a value determined by a rotational speed of the desired track, and controls said translating means to translate said optical pickup device to the desired track after the rotational speed of said disk recording medium reaches a value determined by a rotational speed of the desired track, when said seek signal conveys an order to transfer said optical pickup device from inner to outer tracks of said disk recording medium, and said control means controls said rotating means and said translating means so that said rotating means is activated to reduce the rotational speed of said disk recording medium to a value of a rotational speed of the desired track and said translating means is activated to translate said optical pickup to the desired track simultaneously upon receiving said seek signal, when said seek signal conveys an order to transfer said optical pickup device from outer to inner tracks of said disk recording medium.

2. The optical disk driving apparatus according to claim 1, further comprising focus control means for controlling the position of said optical pickup device, said focus control means being activated when said translating means is activated.

3. An optical disk driving apparatus, comprising:

an optical pickup device having a laser beam source for emitting a laser beam to a constant linear velocity type disk recording medium;

means for rotating said disk recording medium such that a linear velocity of a track on said recording medium accessed by said optical pickup device becomes a predetermined value;

means for translating said optical pickup device along a radius of said disk recording medium in accordance with a seek signal indicative of the track to be accessed by said optical pickup device; and control means responsive to said seek signal for controlling both said translating means and said rotating means, wherein said control means controls said rotating means to reduce a rotational speed of said disk recording medium before the rotational speed of said disk recording medium reaches a value determined by a rotational speed of the desired track and controls said translating means to translate said optical pickup device to the desired track after the rotational speed of said disk recording medium is reduced to substantially the same as the linear velocity of the desired track, when said seek signal conveys an order to transfer said optical pickup device from inner to outer tracks of said disk recording medium, and said control means controls said rotating means and said translating means so that said rotating means is activated to reduce the rotational speed of said disk recording medium to a value of a rotational speed of the desired track and said translating means is activated to translate said optical pickup to the desired track simultaneously upon receiving said seek signal, when said seek signal conveys an order to transfer said optical pickup device from outer to inner tracks of said disk recording medium.

4. The optical disk driving apparatus according to claim 3, further comprising focus control means for controlling the position of said optical pickup device, said focus control means being activated when said translating means is activated.

* * * * *